United States Patent
Xu et al.

(10) Patent No.: US 7,843,456 B2
(45) Date of Patent: Nov. 30, 2010

(54) GRADIENT DOMAIN EDITING OF ANIMATED MESHES

(75) Inventors: Weiwei Xu, Beijing (CN); Kun Zhou, Beijing (CN); Yizhou Yu, Champaign, IL (US); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 11/772,001

(22) Filed: Jun. 29, 2007

(65) Prior Publication Data

US 2009/0002376 A1    Jan. 1, 2009

(51) Int. Cl.
G06T 13/00    (2006.01)

(52) U.S. Cl. .................. 345/473; 345/419; 345/420; 345/423

(58) Field of Classification Search .................. None
See application file for complete search history.

(56) References Cited

U.S. PATENT DOCUMENTS

| | | | |
|---|---|---|---|
| 5,929,867 A | 7/1999 | Herbstman et al. | |
| 6,088,042 A | 7/2000 | Handelman et al. | |
| 6,101,235 A | 8/2000 | Zavaljevski et al. | |
| 6,593,925 B1 * | 7/2003 | Hakura et al. | 345/426 |
| 6,987,511 B2 * | 1/2006 | Taubin | 345/420 |
| 7,151,542 B2 | 12/2006 | Isner | |
| 7,184,039 B2 * | 2/2007 | Borac | 345/420 |
| 7,212,197 B1 * | 5/2007 | Schkolne et al. | 345/419 |
| 7,800,627 B2 * | 9/2010 | Zhou et al. | 345/582 |
| 2005/0231512 A1 | 10/2005 | Niles et al. | |
| 2005/0232587 A1 | 10/2005 | Strawn et al. | |
| 2006/0028466 A1 | 2/2006 | Zhou et al. | |
| 2006/0290693 A1 | 12/2006 | Zhou et al. | |
| 2010/0226589 A1 * | 9/2010 | Mukherjee | 382/264 |

OTHER PUBLICATIONS

Zhou, K., Huang, J., Snyder, J., Liu, X., Bao, H., Guo, B., Shum, H., Large mesh deformation using the volumetric graph Laplacian, Jul. 2005, ACM Transactions on Graphics, vol. 24, Issue 3, pp. 496-503.*
Huang, et al., "Subspace Gradient Domain Mesh Deformation", available at least as early as Apr. 20, 2007, at <<http://research.microsoft.com/users/kunzhou/publications/subspace.pdf>>, pp. 1-9.

(Continued)

Primary Examiner—Said Broome
(74) Attorney, Agent, or Firm—Lee & Hayes, PLLC

(57) ABSTRACT

Gradient domain editing of animated meshes is described. Exemplary systems edit deforming mesh sequences by applying Laplacian mesh editing techniques in the spacetime domain. A user selects relevant frames or handles to edit and the edits are propagated to the entire sequence. For example, if the mesh depicts an animated figure, then user-modifications to position of limbs, head, torso, etc., in one frame are propagated to the entire sequence. In advanced editing modes, a user can reposition footprints over new terrain and the system automatically conforms the walking figure to the new footprints. A user-sketched curve can automatically provide a new motion path. Movements of one animated figure can be transferred to a different figure. Caricature and cartoon special effects are available. The user can also select spacetime morphing to smoothly change the shape and motion of one animated figure into another over a short interval.

17 Claims, 13 Drawing Sheets

OTHER PUBLICATIONS

Shi, et al., "A Fast Multigrid Algorithm for Mesh Deformation", available at least as early as Apr. 20, 2007, at <<http:// graphics.cs.uiuc.edu/~linshi/project/multigrid/multigrid_mesh.pdf>>, ACM SIGGRAPH, 2006, pp. 1-10.

Yoshioka, et al., "A Constrained Least Squares Approach to Interactive Mesh Deformation", available at least as early as Apr. 20, 2007, at <<http://www.nakl.t.u-tokyo.ac.jp/~masuda/papers/SMI2006.pdf, pp. 1-10.

Yu, et al., "Mesh Editing with Poisson-Based Gradient Field Manipulation", available at least as early as Apr. 20, 2007, at <<http://www-sal.cs.uiuc.edu/~yyz/publication/poisson_mesh.pdf>>, ACM SIGGRAPH, 2004, pp. 1-8.

Zhou, et al., "Large Mesh Deformatin Using the Volumetric Graph Laplacian", available at least as early as Apr. 20, 2007, at <<http://research.microsoft.com/users/kunzhou/publications/VGL.pdf >>, pp. 1-8.

* cited by examiner

GRADIENT DOMAIN EDITING OF ANIMATED MESHES

BACKGROUND

Many computer graphics applications, including computer games and 3-D animated films, make heavy use of animated meshes, also known as deforming mesh sequences. Designing and producing visually pleasing mesh sequences, either manually or through physically-based simulation, is a costly and time-consuming process, during which effects caused by interactions between the deforming object and its surroundings need to be considered. For example, a running horse needs to adjust its pace and body configuration according to obstacles and turns in the path as well as undulations on the terrain. This motivates a methodology to automatically create novel mesh sequences by reusing and adapting existing ones.

The goal of adapting existing deforming mesh sequences is to conveniently produce desired sequences that satisfy requirements from both the user and the environment. Compared with static meshes, deforming mesh sequences have an additional temporal dimension that leads to greater data complexity and a few new technical challenges. First, a paramount demand is minimizing the amount of user intervention. This is especially important for long sequences and dictates whether the entire editing system is truly usable.

Second, with minimal user intervention, the system should still permit both flexible and precise user control. Third, given very sparse constraints, the system should be able to produce desired results that preserve both temporal coherence and important characteristics of the deformations in the original mesh sequence.

Laplacian mesh editing extracts intrinsic geometric properties, such as differential coordinates, from the original mesh, subjects them to local transformations during editing, and finally reconstructs new meshes from the transformed differential coordinates by solving a global system of equations. The reconstruction step makes local editing in differential coordinates have a global effect on the new mesh.

The composition of these steps leads to an overall nonlinear process. Due to the existence of efficient solvers for sparse linear systems, much effort has been devoted in the past few years to obtaining approximate solutions using either linearizations or multiple linear passes. The latter typically requires explicit rotational constraints. Alternatively, the problem can be cast as a nonlinear optimization without rotational constraints. Since nonlinear optimizations require more expensive iterative steps, subspace methods have been developed to achieve acceleration. Laplacian mesh editing, however, has not been previously generalized to the spacetime domain.

SUMMARY

Gradient domain editing of animated meshes is described. Exemplary systems edit deforming mesh sequences by applying Laplacian mesh editing techniques in the spacetime domain. A user selects relevant frames or handles to edit and the edits are propagated to the entire sequence. For example, if the mesh depicts an animated figure, then user-modifications to position of limbs, head, torso, etc., in one frame are propagated to the entire sequence. In advanced editing modes, a user can reposition footprints over new terrain and the system automatically conforms the walking figure to the new footprints. A user-sketched curve can automatically provide a new motion path. Movements of one animated figure can be transferred to a different figure. Caricature and cartoon special effects are available. The user can also select spacetime morphing to smoothly change the shape and motion of one animated figure into another over a short interval.

This summary is provided to introduce the subject matter of gradient domain editing of animated meshes, which is further described below in the Detailed Description. This summary is not intended to identify essential features of the claimed subject matter, nor is it intended for use in determining the scope of the claimed subject matter.

DETAILED DESCRIPTION

Overview

Figure 1:
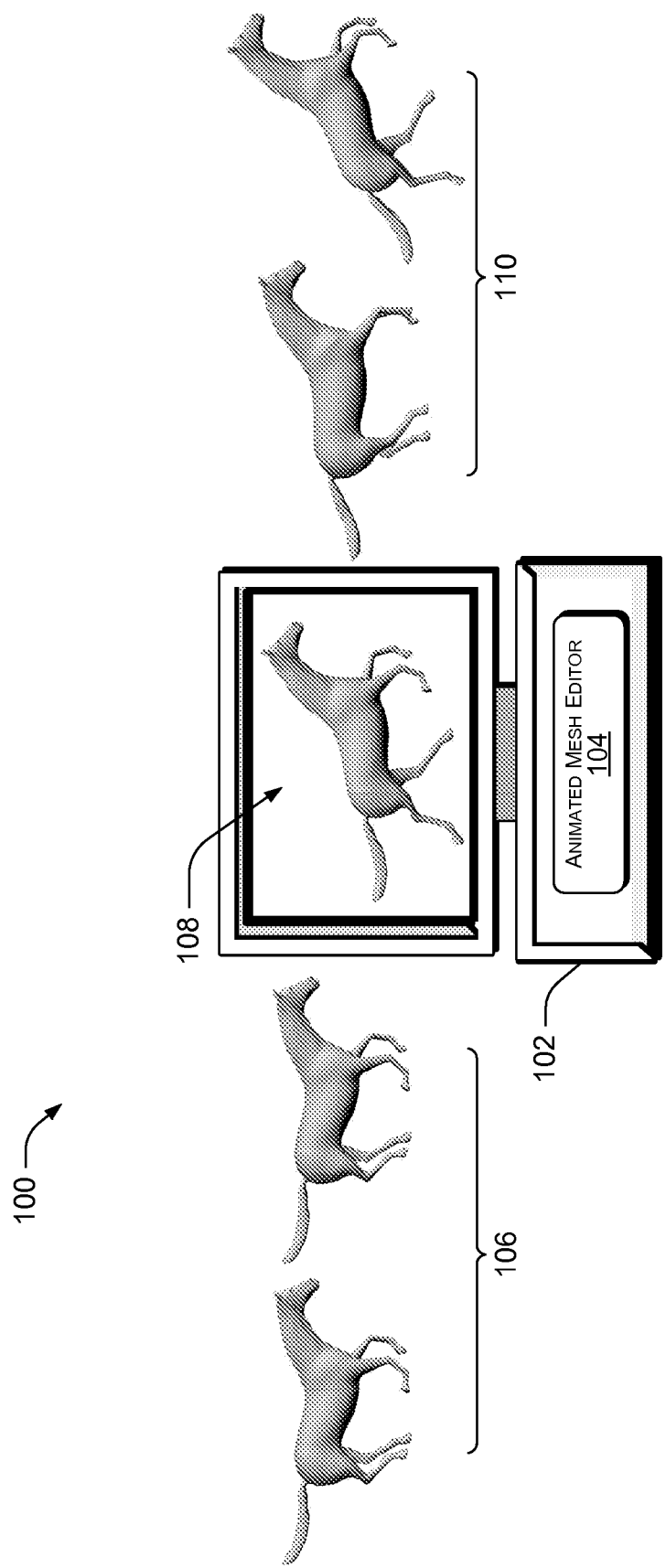
FIG. 1 is a diagram of an exemplary animated mesh editing system.

This disclosure describes gradient domain editing of animated meshes. The animated mesh is edited by applying Laplacian mesh editing techniques in the spacetime domain. Although editing a static mesh in the gradient domain is known—that is, editing one frame that contains one snapshot of the mesh, exemplary systems and methods described herein automatically edit the entire sequence as it progresses temporally, based on received edits at sparsely selected individual frames.

Thus, exemplary systems generalize gradient domain static mesh editing to animated mesh editing, i.e., to deforming mesh sequence editing. Given sparse and irregularly distributed constraints at keyframes throughout the deforming sequence, the system adjusts the meshes at keyframes to satisfy the constraints, and then propagates the constraints and deformations at the keyframes to the entire sequence to generate new deforming mesh sequences. The system enables several novel applications, including footprint editing, path editing, handle based deformation mixing, deformation filtering, and space-time morphing. In addition, the alternating least-squares method obtains high-quality deformation results at keyframes.

An animated mesh is a deforming mesh sequence—across multiple video frames—that forms the underlying 3-dimensional geometrical structure of a moving foreground figure or other 2-dimensional object in a video. That is, the mesh is a mathematical construction of triangles or other geometric shapes joined at their vertices that realistically simulates a moving shape—such as a moving animal or person—in a video sequence. The moving shape can be well-approximated by changing the position of vertices where triangles meet and/or the visual rotation of the triangles, thereby changing the 2-dimensional size and shape of the triangles. This allows control of the visual aspect of the mesh construction as needed to simulate a moving 3-dimensional object on a 2-dimensional display surface. More realism can be attained by using smaller triangles to provide more detail, however this raises processing costs. The mesh is usually covered with an appealing outer layer to visually hide the mesh structure and simulate the depicted figure.

The exemplary system is keyframe-based and edits an animated mesh sequence at selected frames and/or selected trajectory handles so that the edits are propagated to the rest of the mesh sequence via a least-squares energy technique. In an exemplary system, the exemplary alternating least-squares technique is embodied in an engine that lies at the heart of diverse editors, which can provide advanced editing.

The advanced editing capabilities provided herein save the user a great deal of manual work. The user can reposition footprints of a walking mesh figure over a new path and/or new terrain and the system automatically conforms the walking figure to the new footprints. A user-sketched curve allows the system to automatically provide a new motion path to the animated figure. Movements of one animated figure can be transferred to a different figure in a different mesh sequence. Signal processing can be applied to provide caricature and cartoon effects. The user can also select spacetime morphing to change the shape and motion of one animated figure into the shape and motion of another figure over a short time interval.

Exemplary System

FIG. 1 shows an exemplary system 100 in which a computing device 102 hosts an exemplary animated mesh editor 104. The computing device 102 may be a desktop or notebook computer, or other computing device with a processor, memory, data storage, etc. An initial animated mesh sequence 106 (shown stylistically as only the 2-dimensional foreground object that is based on the mesh—i.e., a horse) is input as the raw starting sequence 106 for the animated mesh editor 104 to edit.

In one implementation, a user selects a frame 108 of the initial video 106 and drags a part of the horse to a new position onscreen. For example, the user might lift the head or place the legs, tail, ears, and/or torso, in new position(s). The selected frame 108 being edited becomes an initial keyframe for changes which are then propagated to the remaining frames of the video: i.e., to the new animated mesh sequence 110. Other frames in the animated mesh sequence 106 may also be selected and edited in the same manner. Results are more natural than conventional mesh editing techniques because the exemplary animated mesh editor 104 uses per-vertex local rotations, which prevent severe distortion. The exemplary mesh editor 104 also correctly propagates handle-editing results from the edited keyframe(s) 108 to intermediate frames. The exemplary animated mesh editor 104 defines a single local coordinate frame for each handle, and represents the vertices in each handle using local coordinates for natural propagation that avoids distortion.

As introduced above, many diverse types of advanced editing can be achieved by the exemplary animated mesh editor 104. For example, the animated mesh editor 104 can port a walking sequence from a planar surface to uneven terrain. The animated mesh editor 104 can provide these advanced editing effects through such advanced modes as footprint editing and path editing for walking and running. In footprint editing, the user merely drags footprints to new positions—even over uneven terrain—and the animated walking object walks or runs in the new footprint positions. In path editing, the user merely designates a line or a complex curve, and the animated object walks the new curve. A handle-based deformation mode allows the user to easily transfer handles from one moving object—e.g., a human dancer—to another moving object—e.g., a waving cloth—to make a dancing cloth that follows the movements of the human dancer. Mesh deformation filtering allows animated mesh movements to be caricatured or exaggerated for special effect, such as for making a cartoon. Spacetime morphing allows the exemplary animated mesh editor 104 to smoothly transition the shape and motion of one object into the shape and motion of a second object. For example, a running man can be made to smoothly morph into a crawling baby in a certain number of strides.

Exemplary Engine

Figure 2:
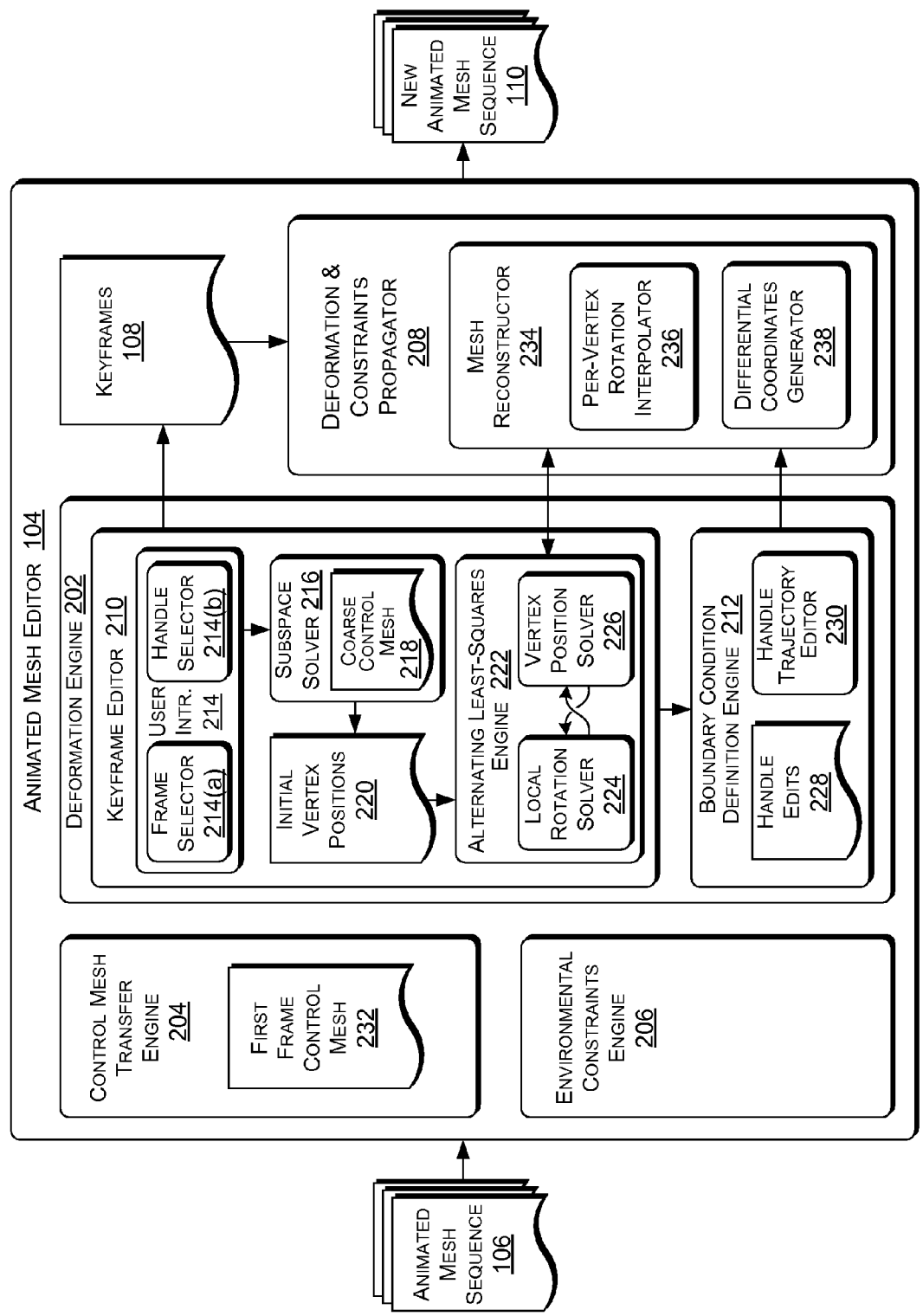
FIG. 2 is a block diagram of the exemplary animated mesh editor of FIG. 1, in greater detail.

FIG. 2 shows one example configuration of the exemplary animated mesh editor 104 of FIG. 1, in greater detail. The illustrated implementation is only one example configuration, for descriptive purposes. Many other arrangements of the components of an exemplary animated mesh editor 104 are possible within the scope of the subject matter. Such an exemplary animated mesh editor 104 can be executed in hardware, software, or combinations of hardware, software, firmware, etc.

The exemplary animated mesh editor 104 includes a gradient domain deformation engine ("deformation engine") 202, a control mesh transfer engine 204, an environmental constraints engine 206, and a deformation & constraints propagator 208.

The deformation engine 202 further includes a keyframe editor 210 and a boundary condition definition engine 212. The keyframe editor 210 may further include a user interface 214 that includes a frame selector 214(a) and a handle selector 214(b), a subspace solver 216 that uses a coarse control mesh 218 and provides initial vertex positions 220, and an alternating least-squares engine 222. The alternating least-squares engine 222 includes a local rotation solver 224 and a vertex position solver 226. The boundary condition definition engine 212 inputs handle edits 228 and includes a handle trajectory editor 230.

The control mesh transfer engine 204 operates on a first frame control mesh 232 as a starting point. The deformation & constraints propagator 208 further includes a mesh reconstructor 234, which may include a per-vertex rotation interpolator 236, and a differential coordinates generator 238.

The exemplary animated mesh editor 104 receives the animated mesh sequence 106 (also shown in FIG. 1) as input and creates the new animated mesh sequence 110 as output.

Detail and Operation of the Exemplary Engine

The exemplary animated mesh editor 104 is keyframe-based. At the user interface 214, the user can choose to edit any frame in the original mesh sequence 106 as well as any handle on that frame. Handles will be described in greater detail below. The visual environment may induce constraints at certain frames—for instance, a walking mesh figure should walk over a hill, not through it. Each frame with environment-induced or user-supplied constraints subsequently becomes a keyframe 108. The location of these constraints varies among different keyframes 108. Adapting the original deforming mesh 106 to satisfy such sparse and irregularly distributed constraints at unevenly spaced keyframes 108 is conventionally a daunting task. The keyframe editor 210 first adjusts the meshes at the keyframes 108 to satisfy these constraints, and then the deformation & constraints propagator 208 smoothly transfers the constraints and deformations from keyframes 108 to the entire sequence 106 to generate a new deforming mesh sequence 110.

The keyframe editor 210 harnesses the power of the subspace (deformation) solver 216 and the two-pass linear methods that are inherent in the alternating least-squares engine 222 to achieve high-quality deformations. The boundary condition definition engine 212 effectively defines boundary conditions for all frames in a sequence 110 using an exemplary handle trajectory editor 230. Implementations of the exemplary animated mesh editor 104 have been successfully applied to the above-introduced editing scenarios that possess increasing complexity, including footprint editing, path editing, temporal filtering, handle-based deformation mixing, and spacetime morphing.

In one sense, since each keyframe is edited independently, adjusting each of them to satisfy its respective constraints is a static mesh editing problem. Conventional gradient domain mesh deformation techniques have limitations when used repeatedly for many keyframes. Two-pass linear methods typically require additional rotational constraints, which are not convenient to supply when such constraints are needed at many keyframes 108. Moreover, sometimes it is impossible to specify rotations for environment-induced constraints.

On the other hand, geometric subspace deformation can deduce rotations from positional constraints via nonlinear optimization. Nevertheless, this demands a control mesh for each frame and is sensitive to the quality of the control mesh. Further, it is difficult to guarantee the quality of control meshes when they are automatically generated for all the frames in a sequence 106. Because of this, the alternating least-squares engine 222 performs keyframe editing by harnessing the power of subspace deformation and two-pass linear methods to achieve high-quality deformations even when the control mesh is problematic.

After the keyframe editor 210 performs editing, the deformation & constraints propagator 208 smoothly transfers both the deformations and constraints at keyframes 108 to the rest of the frames in the sequence 110. The deformations are defined as local transforms of the differential coordinates between a pair of original and deformed keyframes 108. The propagated deformations are used by the differential coordinates generator 238 to generate target differential coordinates for each frame. The mesh reconstructor 234 uses boundary conditions to perform subsequent mesh reconstruction from target differential coordinates. Therefore, the handle trajectory editor 230 uses a least-squares technique to propagate the constraints at keyframes 108 to the rest of the frames to serve as boundary conditions.

Alternating Least-Squares for Mesh Deformation

The exemplary keyframe editor 210 introduces an accurate nonlinear solution for static mesh deformation of individual keyframes 108. A deformed mesh should satisfy deformation constraints while optimally preserving the local relative configurations among neighboring vertices under rotation invariant criteria. This has motivated the introduction of a local frame at each vertex in conventional techniques, where a solution of the deformed mesh is obtained by solving the altered local frames and vertex positions in two sequential linear steps. Suppose $\hat{v}_i$ and $v_i$ represent the same vertex in the original and deformed meshes, respectively. One of the rotation-invariant properties in this approach can be expressed as in Equation (1):

$$v_j - v_i = R_i \hat{v}_{i \to j}, j \in N_i, \tag{1}$$

where $N_i$ represents the index set of the 1-ring neighbors of $v_i$, $R_i$ is a 3×3 rotation matrix that represents the altered local frame at $v_i$, and $\hat{v}_{i \to j}$ represents the local coordinates of $\hat{v}_j$ in the local frame $\hat{R}_i$, at $\hat{v}_i$ in the original mesh. The columns of $R_i$ consist of the three orthonormal axes, $(b_1^i, b_2^i, N^i)$, of the local frame. Once the altered local frames are known, Equation (1) over all vertices gives rise to an overdetermined linear system for vertex positions and can be solved using least-squares if a boundary condition is given.

It is suboptimal to first solve local frames and then solve vertex positions in the sense that they may not optimally satisfy the overdetermined system expressed in Equation (1). Instead, it is more optimal to solve both local frames and vertex positions simultaneously by minimizing the objective function in Equation (2):

$$\sum_i \sum_{j \in N_i} \|v_j - v_i - R_i \hat{v}_{i \to j}\|^2 + \|CV - U\|^2, \tag{2}$$

where $v_i$, $v_j$ and $R_i$ are unknowns, V represents the set of constrained vertices on handles, C is the positional constraint matrix, and U is the target positions of the constrained vertices.

Simultaneously optimizing all the unknowns in Equation (2) gives rise to an expensive nonlinear least-squares problem. Fortunately, an initial inaccurate solution to this nonlinear problem can be refined until convergence is reached. For example, the alternating least-squares engine 222 can iterate two simpler and more efficient least-squares steps, which are responsible for improving, respectively, the estimation of the local frames and the vertex positions. The first of these two steps minimizes Equation (2) by fixing the vertex positions and optimizing $R_i$'s only. The second step does the opposite.

The second step results in the same overdetermined linear system as in Equation (1). Although the first step is nonlinear, the fixed vertex positions allow solving of the optimal local frame at each vertex independently. Thus, minimizing Equation (2) becomes equivalent to minimizing the local objective function in Equation (3), once for each local frame:

$$\sum_{j \in N_i} \|(v_j - v_i) - R_i \hat{v}_{i \to j}\|^2, \tag{3}$$

where the optimal rotation matrix $R_i$ can be conveniently obtained from a closed-form quaternion-based solution: a local shape matching problem. The problem has a unique solution as long as $v_i$ has two or more 1-ring neighbors and $v_i$ is not collinear with them. Since the number of vertices in a 1-ring neighborhood is practically bounded, solving the local frames at all vertices using this closed-form solution has a linear complexity.

Overall, the keyframe editor 210 successfully minimizes Equation (2) using a combination of local shape matching and sparse linear systems without the expensive global shape matching that is typically used in nonlinear optimization. The alternating least-squares convergence can be guaranteed, since the two alternating steps respectively obtain optimal least-squares solutions with respect to the subset of the variables they optimize. In one implementation, the local rotation solver 224 optimizes the rotations using Horn's closed-form solution, which has the same least-squares objective function in Equation (2). The vertex position solver 226 optimizes vertex positions while fixing rotations. Both steps monotonically decrease the least-squares objective function defined in Equation (2) and therefore guarantee convergence.

An initial solution to Equation (2) is still needed to start the iterations. One conventional subspace method uses a coarse control mesh to obtain an approximate solution inside a subspace (see Huang J., Shi, X., Liu, X, Zhou, K. Wei, L.-Y., Teng, S.-H., Bao, H., Guo, B., and Shum, H.-Y, "Subspace gradient domain mesh deformation," *ACM Transactions on Graphics,* 2006, 25, 3, 1126-1134: the "Huang 2006 reference," which is incorporated herein by reference, in its entirety). The subspace solver 216 uses a coarse control mesh 218 to provide such an approximate subspace solution to serve as a desirable starting point for initializing the alternating least-squares engine 222. In addition, the subspace solver 216 merely requires positional constraints. Even though the iterations of the alternating least-squares engine 222 involve rotations, the initial rotations can be estimated from the initially deformed vertex positions supplied by the subspace solver 216. As a result, the exemplary keyframe editor 210 can also work with positional constraints only.

In many implementations, the alternating least-squares engine 222 can achieve smooth and visually pleasing results in less than ten iterations. For example, in one implementation, using the sparse linear solver from CHOLMOD, the running time for each iteration is 0.03 second on a 3.2 GHz Pentium processor for a mesh with 10,000 vertices (Davis, T. A., "User Guide for CHOLMOD," *Tech. rep.*, University of Florida, 2006).

Since the exemplary alternating least-squares engine 222 can reach a more globally optimal solution than conventional methods, it can achieve better visual results as well. Many conventional methods need user-supplied rotational constraints while the alternating least-squares engine 222 does not. Although in one implementation, the alternating least-squares engine 222 does not explicitly enforce the smoothness of the rotation field over the deformed mesh as in some conventional techniques, the local frames as well as the resulting rotation field obtained are in fact smoothly varying because they are extracted from 1-ring neighborhoods as in Equation (3) and the 1-ring neighborhoods of adjacent vertices have partial overlap.

Figure 3:
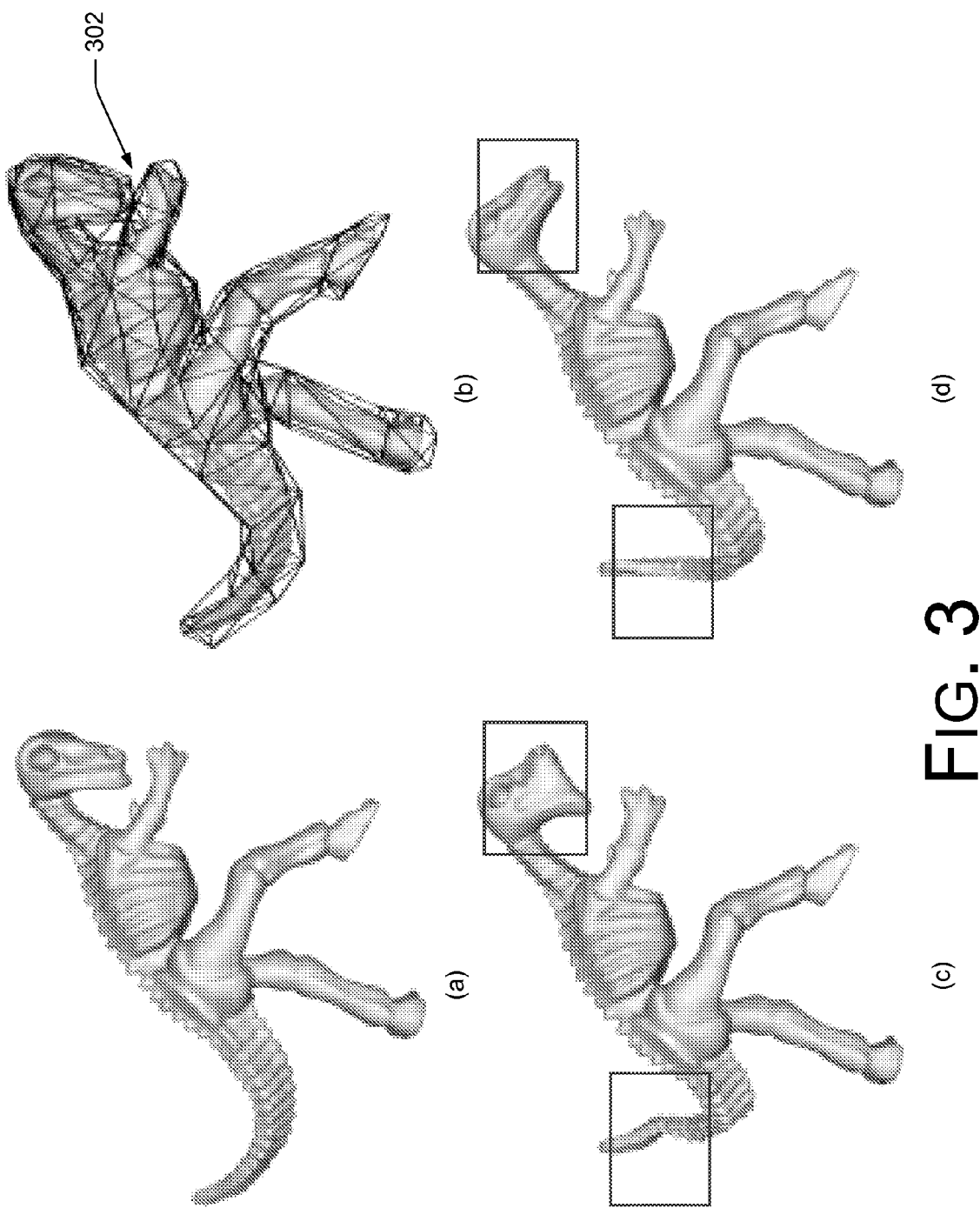
FIG. 3 is a diagram comparing results of the animated mesh editor of FIGS. 1 and 2 with a conventional subspace technique.

FIG. 3 compares results of the exemplary keyframe editor 210 with a conventional subspace technique in the Huang 2006 reference cited above. One issue is that self-intersections in the conventional control mesh as well as its coarse resolution can result in unnatural deformation results from the subspace technique while the alternating least-squares engine 222 can successfully eliminate the problems in such results. FIG. 3(a) shows the rest pose of a mesh-based figure. FIG. 3(b) shows the control mesh. Since the head and hand of the illustrated dinosaur figure are too close to each other, the subspace technique causes self-intersections 302 in the control mesh. As a result, the subspace method produces the unnatural results shown in FIG. 3(c), while the exemplary alternating least-squares engine 222 preserves the details of the original shape very well, as shown in FIG. 3(d).

Several other nonlinear techniques can be used to produce satisfactory deformation results for the static mesh shown in FIG. 3 as well. However, the exemplary keyframe editor 210, built upon the subspace method in the Huang 2006 reference, further provides additional control over deformation results, including volume constraint, skeleton constraint, and projection constraint. Therefore, the exemplary gradient domain deformation engine 202 with its alternating least-squares keyframe editor 210 is a more convenient tool for interactive keyframe editing.

Editing Deforming Mesh Sequences

In the spacetime framework in which the exemplary animated mesh editor 104 operates, given a deforming mesh sequence, the user interface 214 allows the user to choose to edit an arbitrary subset of frames. In the following, these chosen frames are called keyframes 108, because a frame that contains user-provided or environment-imposed constraints becomes a keyframe 108 for modifying the intermediate frames between the keyframes 108. At each keyframe 108, the user can choose to edit an arbitrary subset of handles. A handle is defined as a subset of neighboring vertices within the same frame. When manipulating a handle, the user only has to drag one vertex in the handle to provide a positional constraint. The rotation of the handle can be automatically obtained by the keyframe editor 210 from the nonlinear optimization introduced in the previous section. In one implementation, it is assumed that the mesh connectivity remains the same across all frames.

Given sparse positional constraints on the handles, an overall objective function for spacetime editing across all frames can be formulated as $$\sum_k \sum_i \left\| L^k v_i^k - R_i^k \hat{d}_i^k \right\|^2 + \sum_k \sum_i \|\Delta_t R_i^k\|_F^2 + \sum_k \|C^k V^k - U^k\|^2 \quad (4)$$

where $L^k$ is the matrix for computing spatial Laplacian differential coordinates at the k-th frame, $\hat{d}_i^k$ is the vector of differential coordinates at the i-th vertex of the original mesh at the k-th frame, $R_i^k$ is the local rotation matrix at $v_i^k$, $\Delta_t R_i^k$ represents the differences of corresponding rotation matrices in consecutive frames, and $C^k$, $V^k$, and $U^k$ are similar to C, V, and U in Equation (2). The second term in Equation (4) enforces temporal coherence of local rotations. In this objective function, for the sake of clarity, terms accommodating additional constraints have been left out, such as volume preservation. Directly optimizing such a nonlinear objective function with respect to vertex positions and local rotations across all the frames is extremely expensive. More importantly, simultaneous optimization in both spatial and temporal domains typically does not preserve very well the shape of the meshes at individual frames because the solution needs to provide a tradeoff between these two domains.

In one implementation, the deformation engine 202 obtains a numerically suboptimal solution, which nonetheless is capable of producing visually pleasing results. Once constraints are set up, the deformation engine 202 performs the following steps to minimize Equation (4) and produce a new deforming mesh sequence 110 that is consistent with all constraints while maintaining temporal coherence of both local rotations and handle positions.

First, since obtaining the initial solution for alternating least-squares requires a coarse control mesh 218 to make the solution applicable in the spacetime domain, the control mesh transfer engine 204 creates and/or transfers a control mesh for each frame in the input sequence 106. In one implementation, to minimize user interaction, the animated mesh editor 104 merely requires a first frame control mesh 232 and automatically generates a control mesh for each subsequent frame by adjusting the first one 232.

Second, the mesh at each keyframe 108 is deformed to satisfy the positional constraints at that keyframe 108 via the alternating least-squares engine 222 introduced above. As an output, the alternating least-squares engine 222 provides an altered local coordinate frame as well as an associated rotation at each vertex over the deformed mesh.

Third, the per-vertex rotation interpolator 236 smoothly interpolates these rotations for each vertex of the keyframes 108 to obtain dense rotational constraints at each intermediate frame. Rotations can be represented as unit quaternions, and the logarithm of the quaternions can be interpolated using Hermite splines. Those frames at the very beginning or end of the mesh sequence 106 may not be bracketed by sufficient number of keyframes 108 and are therefore only linearly interpolated or not interpolated at all. The user can optionally designate an influence interval for a keyframe 108 to have finer control over the interpolation.

Fourth, the handle trajectory editor 230 extracts an average translation and rotation for each handle from the translations and rotations associated with individual vertices in the handle. Since each handle has its own temporal trajectory in the original mesh sequence 106, this trajectory is automatically edited and updated using the extracted average translations and rotations at keyframes 108 to guarantee its temporal consistency.

Lastly, the mesh reconstructor 234 solves a deformed mesh for each intermediate frame (between the keyframes 108) using the interpolated rotational constraints as well as the positional constraints from the updated handles. Since there is already a rotational constraint at each free vertex, the mesh reconstructor 234 can obtain a deformed mesh quickly by simply solving the overdetermined linear system in Equation (1) without invoking the more expensive subspace solver 216. A few iterations of the alternating least-squares engine 222 can optionally be applied to improve the deformed mesh.

In terms of the objective function in Equation (4), its first and third terms are minimized by the second and last steps (above) respectively for the keyframes 108 and intermediate frames. The second term of Equation (4) is reduced in the third step above. The positional constraints at intermediate frames are automatically set up by the fourth step above. Compared to simultaneously optimizing all of Equation (4)'s unknowns at once, the above sequential steps can preserve shapes better at individual frames. More details regarding the control mesh transfer engine's 204 automatic control mesh generation (the first step) and the handle trajectory editor's 230 handle propagation (the fourth step) follow.

Figure 4:
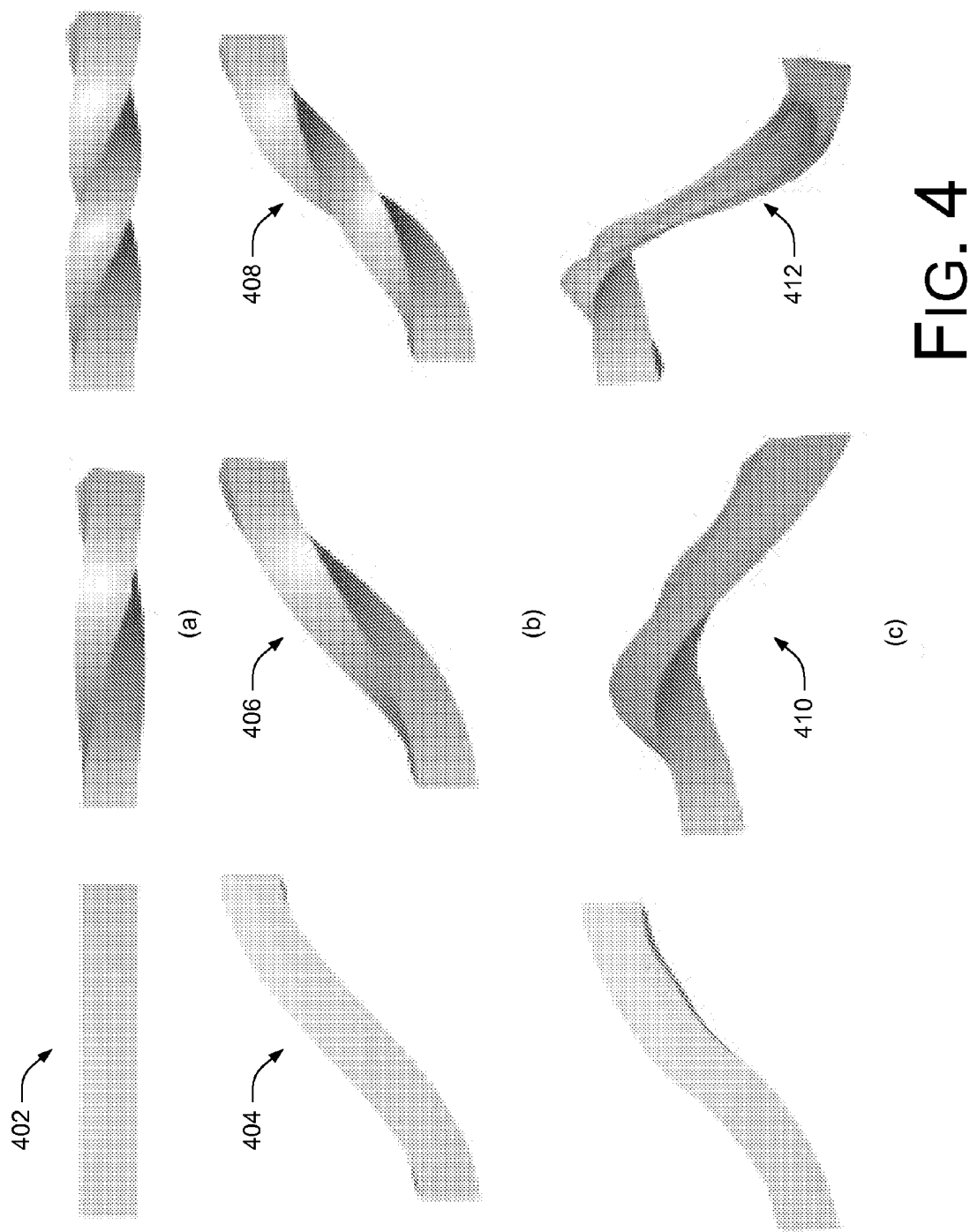
FIG. 4 is a diagram comparing exemplary gradient domain mesh editing with a conventional multi-resolution method for mesh editing.

FIG. 4 shows a comparison between the gradient domain editing steps and methods implemented in the exemplary animated mesh editor 104 and a conventional multi-resolution method for mesh editing. FIG. 4(a) shows an original, unedited, box twisting sequence. FIG. 4(b) shows the result from the exemplary animated mesh editor 104. FIG. 4(c) shows the result from the multi-resolution editing method. In this example, the keyframe editor 210 receives the original first frame 402; edits the first frame 404, which becomes a keyframe; and then propagates the deformation at the first frame 404 to the entire sequence: frames 406 and 408. The exemplary animated mesh editor 104 generates natural results (406 and 408) while the results from the multi-resolution method have severe distortions: frames 410 and 412.

This is because the multi-resolution method is based on local detail vectors only while the exemplary animated mesh editor 104 is based on local rotations.

Handle Trajectory Editing

In one implementation, the deformation and constraints propagator 208 performs the critical function of correctly propagating the handle editing results from the keyframes 108 to all intermediate frames since altered handles serve as new boundary conditions when the meshes at the intermediate frames are deformed and reconstructed. Because there are multiple vertices in the same handle and interpolating each vertex position individually at intermediate frames would severely distort the overall shape of the handle, these vertices are forced to move together rigidly using the extracted average translation and rotation. A single local coordinate frame is defined for each handle and represents the vertices in that handle using their local coordinates. Formally, a deformation handle i at frame k is denoted as $H_i^k = \{c_i^k, F_i^k, \{v_{im}^k | m=0, \ldots, n_p-1\}\}$, where $\{v_{im}^k | m=0, \ldots, n_p-1\}$ is the set of vertices in the handle, and $c_i^k$ and columns of $F_i^k$ define the origin and axes of the local coordinate frame. The term $C_i^k$ can be the centroid of the vertices and the initial axes can be defined arbitrarily since in one implementation the exemplary technique only considers the rotation between the initial and altered axes.

Suppose there are $n_f$ frames in the entire mesh sequence 106. When a set of corresponding handles $\{H_i^k, 0 \leq k \leq n_f\}$ are considered collectively, the boundary condition definition engine 212 can define a piecewise linear curve in the temporal domain and then $\{c_i^k 0 \leq k \leq n_f\}$ is the set of vertices of this curve. $\{F_i^k 0 \leq k \leq n_f\}$ can also be used to define the axes of the local coordinate frames at these vertices. Once the meshes at keyframes 108 have been adjusted by the keyframe editor 210, the boundary condition definition engine 212 defines a new local coordinate frame at each altered handle using the extracted average translation and rotation. These new local coordinate frames impose both positional and rotational constraints on the curve. Under these constraints, the handle trajectory editor 230 determines the new positions and rotations for the rest of the vertices on the curve. Thus, handle trajectory editing can be cast as a temporal curve editing problem.

Next, the rotation invariant property in Equation (1) is extended from spatial meshes to temporal curves. Thus, Equation (1) can be reformulated as $$c_i^l - c_i^k = F_i^k \hat{c}_i^{k \to l}, l \in N^k, \tag{5}$$

where $\hat{c}_i^k$ and $c_i^k$ represent the original and new handle centroids, $N^k$ represents the index set of the immediate neighbors of $c_i^k$, the term $|N^k| \leq 2$; and the term $\hat{c}_i^{k \to l}$ represents the local coordinates of $\hat{c}_i^l$ in the local frame—$\hat{F}_i^k$—defined at $\hat{c}_i^k$ in the original curve. Corresponding handle rotations at keyframes 108 are simply interpolated over the rest of the vertices on the curve to determine the orientation of all the new local coordinate frames, $\{F_i^k\}$, at these vertices. Once these altered local frames are known, Equation (5) over all unconstrained vertices gives rise to an overdetermined linear system for vertex positions and can be solved using least-squares. Such a least-squares problem is solved for each curve. Since the number of vertices on a curve is relatively small, the least-squares problem can be solved very quickly. The new world coordinates of the vertices inside each handle at an intermediate frame can be obtained by maintaining their original local coordinates in the new local coordinate frame at that handle.

Figure 5:
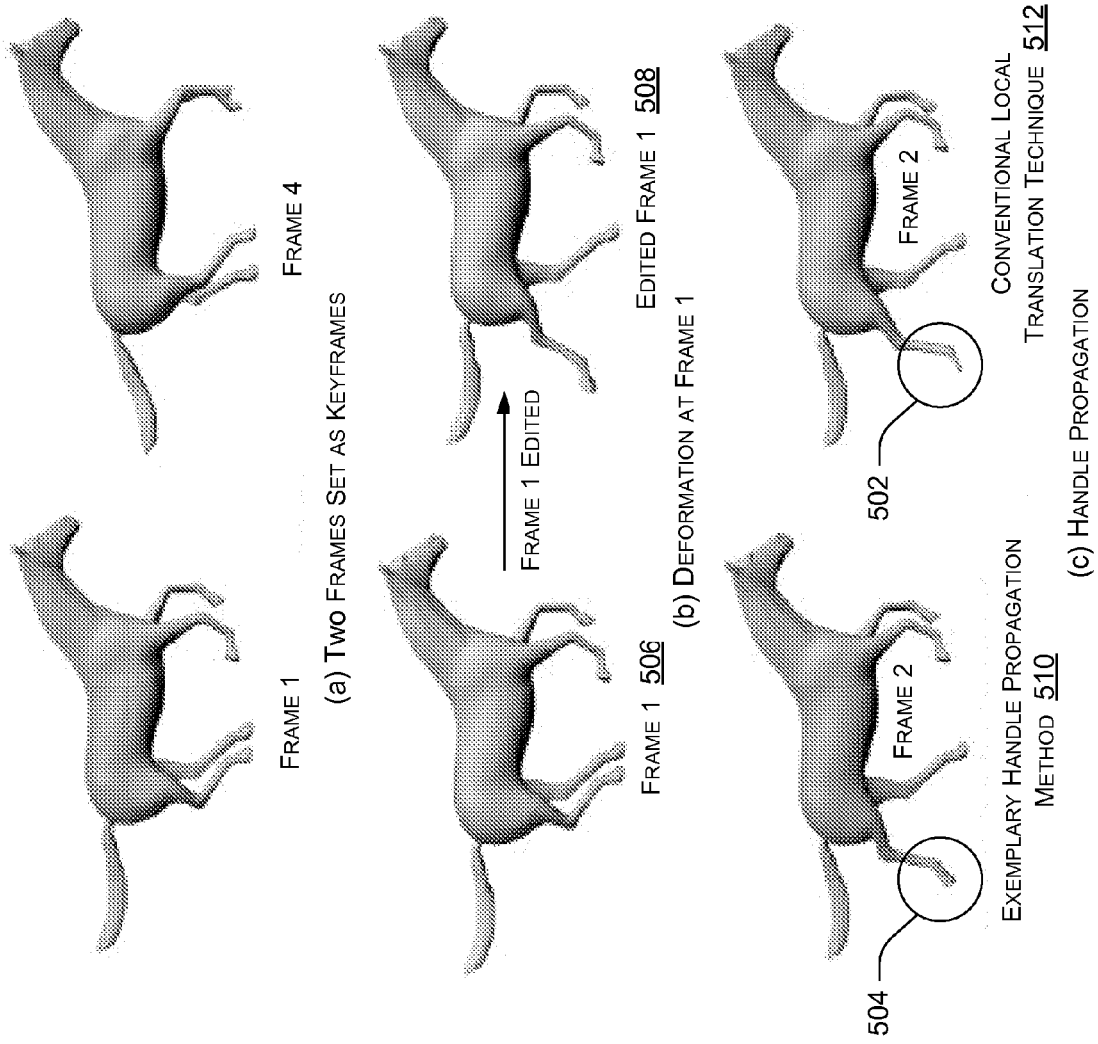
FIG. 5 is a diagram comparing results provided by the exemplary handle trajectory editor of FIG. 2 with results provided by a conventional simple local translation at each vertex.

FIG. 5 shows a comparison of results from the exemplary handle trajectory editor 230 and those provided by a conventional simple local translation at each vertex. It is apparent that conventional local translation shrinks the size of the horse leg 502 while results from the exemplary handle trajectory editor 230 remain natural 504. In FIG. 5(a), frames #1 and #4 in the sequence are set as keyframes. FIG. 5(b) shows frame #1 edited: i.e., before editing 506 and after editing 508. FIG. 5(c) shows edited results at the second frame in the sequence (frame #2). The exemplary handle trajectory editor 230 generates natural results 510 at frame #2, while editing based on conventional simple local translation generates severe distortion 512 at frame #2 in the edited leg.

Control Mesh Transfer

In the subspace method of the Huang 2006 reference cited above, a coarse control mesh is used for creating a deformed version of a finer mesh through a linear relationship, given in Equation (6):

$$V^f = WV^c, \quad (6)$$

where $V^f$ represents vertices of the finer mesh, $V^c$ represents vertices of the control mesh, and W is a matrix of mean value coordinates. In the current context, given the first frame control mesh 232 of a deforming mesh sequence 106, the control mesh transfer engine 204 exploits the frame-to-frame deformation of the finer mesh to automatically construct an altered control mesh for each keyframe 108 in the sequence 106. The altered control mesh has altered vertex positions but the same mesh connectivity.

Figure 6:
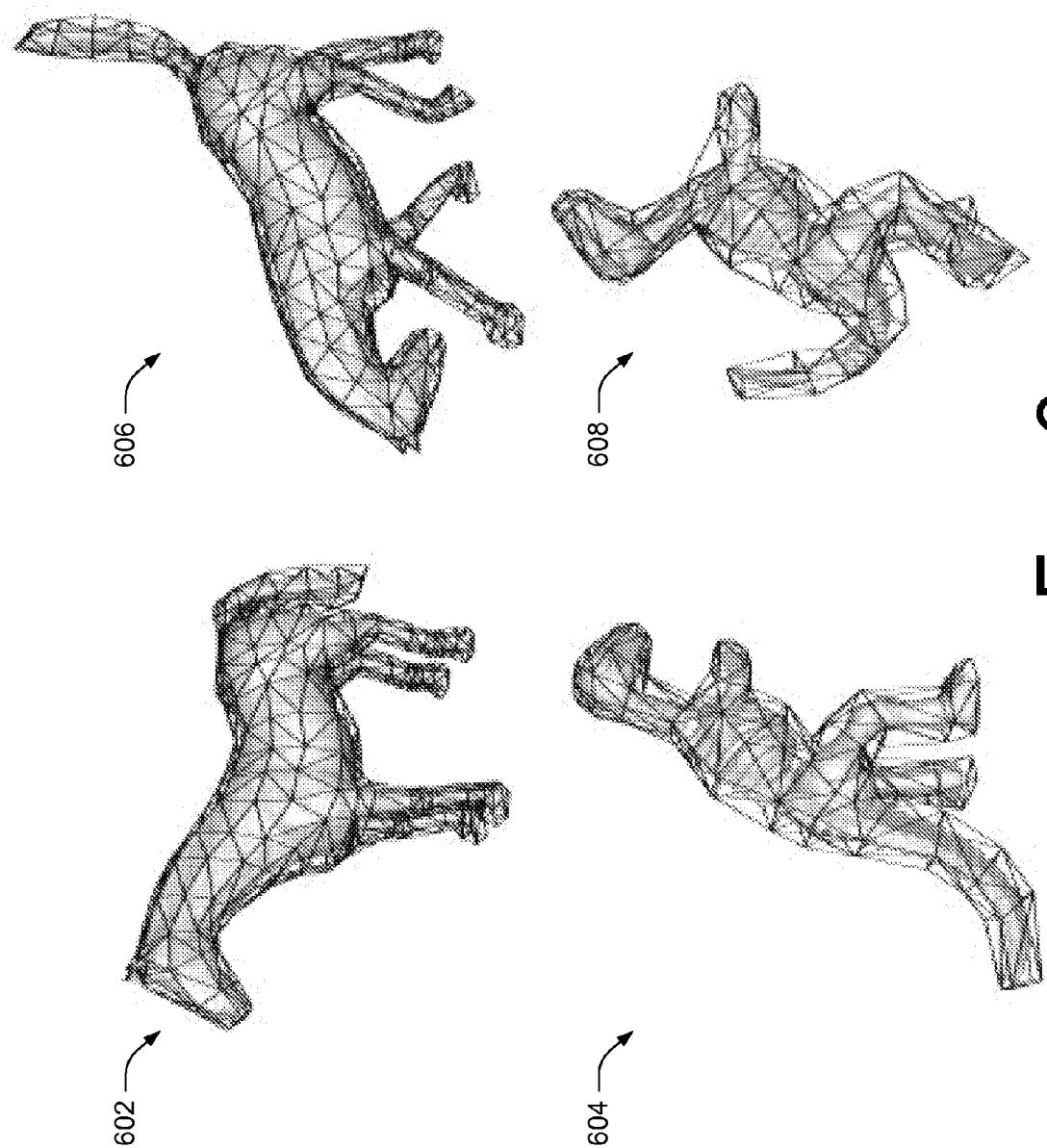
FIG. 6 is a diagram showing exemplary results provided by the control mesh transfer engine of FIG. 2.

It is possible to draw an analogy between this process and linear blend skinning, and consider the control mesh as the "skin" while a subset of vertices on the finer mesh are the "bones." The control mesh transfer engine 204 first binds the control mesh to the finer mesh at the first frame, and then uses the same binding throughout the rest of the sequence 106. At the first frame, for each vertex $\tilde{v}_j$ of the control mesh, the engine 204 finds $n_b$ vertices, i.e., $\{v_{im}\}_{m=0}^{nb-1}$, on the finer mesh where the mean value coordinate from $\tilde{v}_j$ is the largest. This is achieved by searching the j-th column of W. The term $\tilde{v}_j$ is represented in the local frames of these $n_b$ vertices. That is, $\tilde{v}_j = v_{im} + R_{im}\tilde{v}_{im \to j,m} = 0, \ldots, n_b - 1$, where $\tilde{v}_{im \to j}$ represents $\tilde{v}_j$'s local coordinates in $v_{im}$'s local coordinate frame. Then $\tilde{v}_j$'s new world coordinates are determined for another frame in the mesh sequence. The engine 204 first finds the corresponding vertices of $\{v_{im}\}_{m=0}^{nb-1}$ in the finer mesh at that frame, and then transfers $\tilde{v}_j$'s local coordinates, $\{\tilde{v}_{im}\}_{m=0}^{nb-1}$, to the local coordinate frames at these corresponding vertices. Potentially different world coordinates can be recovered from these multiple local frames. In one implementation, the control mesh transfer engine 204 simply uses their linear blend as $\tilde{v}_j$'s new world coordinates. Experimentation reveals that even uniform weighting in the linear blending can achieve good results. FIG. 6 shows two typical results provided by the control mesh transfer engine 204. As illustrated on the left, first frames 602 and 604 are shown with assigned control mesh in two different deforming mesh sequences. On the right, the automatically transferred control meshes are shown at respective later frames 606 and 608.

Exemplary Methods

Figure 7:
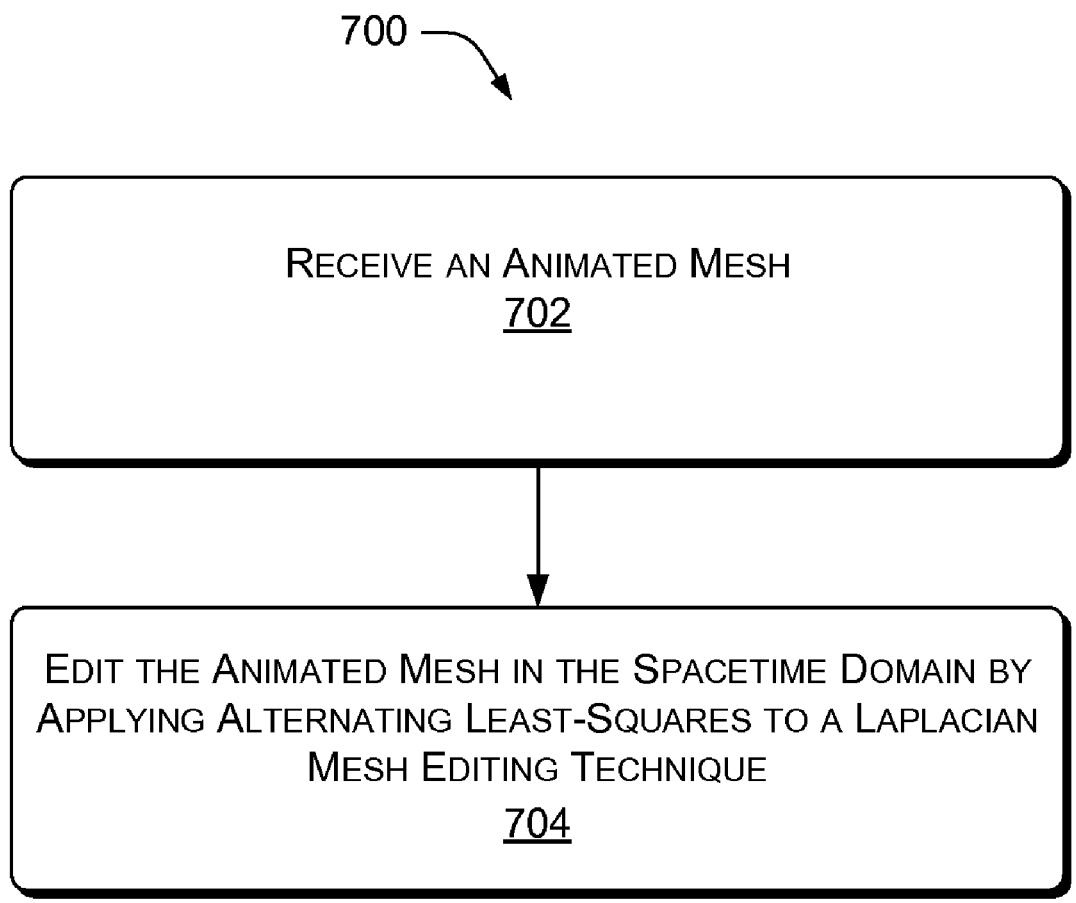
FIG. 7 is a flow diagram showing an exemplary method of animated mesh editing.

FIG. 7 shows an exemplary method 700 of animated mesh editing 700. In the flow diagram, the operations are summarized in individual blocks. The exemplary method 700 may be performed by hardware, software, or combinations of hardware, software, firmware, etc., for example, by components of the exemplary animated mesh engine 104.

At block 702, an animated mesh is received. An animated mesh is a deforming mesh sequence—a sequence of video frames that typically include a visual foreground object generated or depicted in terms of a geometrical model of triangles (or other polygons) connected at their vertices to make a geometrical structure composed of the triangles—the mesh. The mesh can be mathematically generated or manipulated. For visual effect, the mesh is typically covered with a visual skin to portray a moving person or animal.

At block 704, the animated mesh is edited in the spacetime domain by applying alternating least-squares to a Laplacian mesh editing technique. Although editing a static mesh in the gradient domain is known—that is, editing one frame that contains one snapshot of the mesh, the exemplary method 700 automatically edits the entire sequence as it progresses temporally, from edits of sparsely selected individual frames. In one implementation, the exemplary method 700 includes transferring a control mesh modified from the first frame of the received sequence, across the rest of the frames. This provides constraints and boundary conditions for later calculations. The method also accounts for environment-induced constraints.

Applying alternating least-squares in the spacetime domain includes receiving initial information from a subspace solving technique and iterating between solving local vertices and solving local rotations. Creating a new animated mesh sequence includes propagating the deformations and constraints at the edited keyframes to intermediate frames in the sequence. In one implementation, this involves handle trajectory editing, in which a least-squares technique propagates the constraints at keyframes to the rest of the frames to serve as boundary conditions.

Advanced Editing Methods

The exemplary animated mesh editor 104 described as an engine above is powerful and the processes that it implements may save the user a great deal of manual editing labor. Sometimes it may become tedious for the user to generate more advanced editing effects. For example, porting a walking sequence from a planar surface to an uneven terrain conventionally requires a great deal of user interaction. In the following section, advanced editing modes are described which can be built on top of the exemplary method 700 or on top of the exemplary animated mesh editor 104. Among these advanced modes, footprint editing and path editing are specifically designed for motion similar to walking and running. Handle-based deformation mixing can be useful for duplicating handle movements from a source sequence to a target sequence. In advanced editing modes, the exemplary techniques not only alter the shape of the deforming mesh sequence but also the overall motion of the shape, which is very hard to achieve using conventional methods, such as multi-resolution mesh editing.

Footprint Editing Method

During walking or running, humans or animals typically have at least one support leg in contact with the ground. The moving mesh figure leaves a so-called footprint there. In an exemplary method, the footprint is defined within an interval of the frames in which a handle remains fixed on the ground. In exemplary footprint editing, the user revises the original footprints, and lets the exemplary method automatically adapt the original walking motion to the new footprints.

There are two major advantages of footprint editing. First, when manipulating footprints, the user saves time by editing the same handle at several frames simultaneously. Second, footprints correctly capture the constraints that should be satisfied in walking motion. So, the user does not have to take time to explicitly specify keyframes in order to avoid the annoying phenomenon of footskating.

To extract footprints, the user first defines a handle that represents the foot. After that, the footprints are automatically detected by checking within an interval if the position of the handle is unchanged or the changes are less than a threshold. A frame that contains a footprint is automatically set as a keyframe. The exemplary method allows the user to either directly place or project footprints onto a terrain. The footprint can be rotated during projection by aligning the local surface normal of the terrain and the up-axis of the local frame at the footprint.

Figure 8:
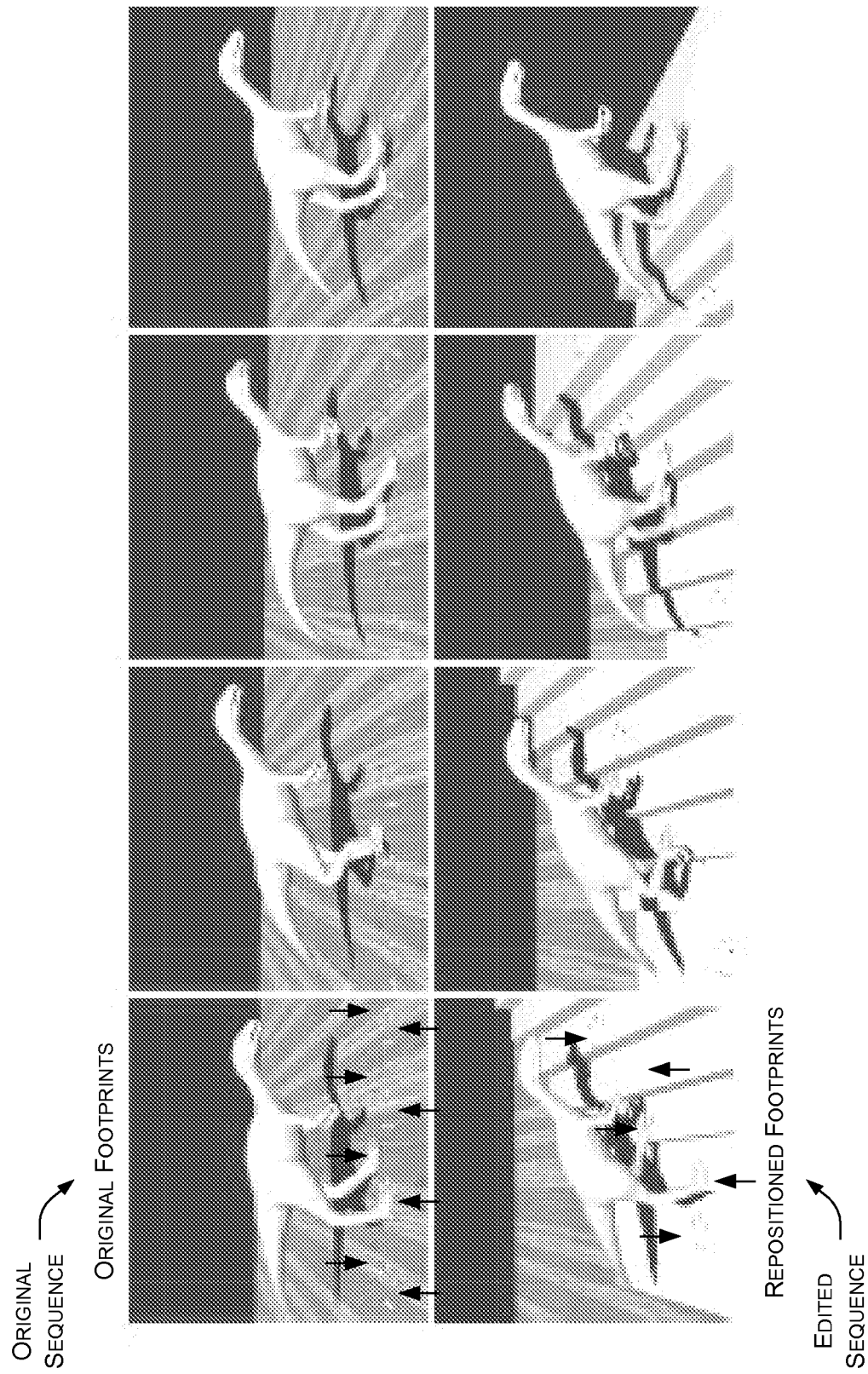
FIG. 8 is a diagram of results of an exemplary method of footprint editing.

FIG. 8 shows exemplary footprint editing. The user relocates the footprints, and the exemplary method automatically generates the edited sequence. A planar walking sequence is adapted to stair walking simply by dragging left and right footprints to new locations. In this example, the user only has to relocate the footprints to the stairs, and the exemplary method 700 or the exemplary animated mesh editor 104 automatically generates the stair walking sequence.

Path Editing Method

Figure 9:
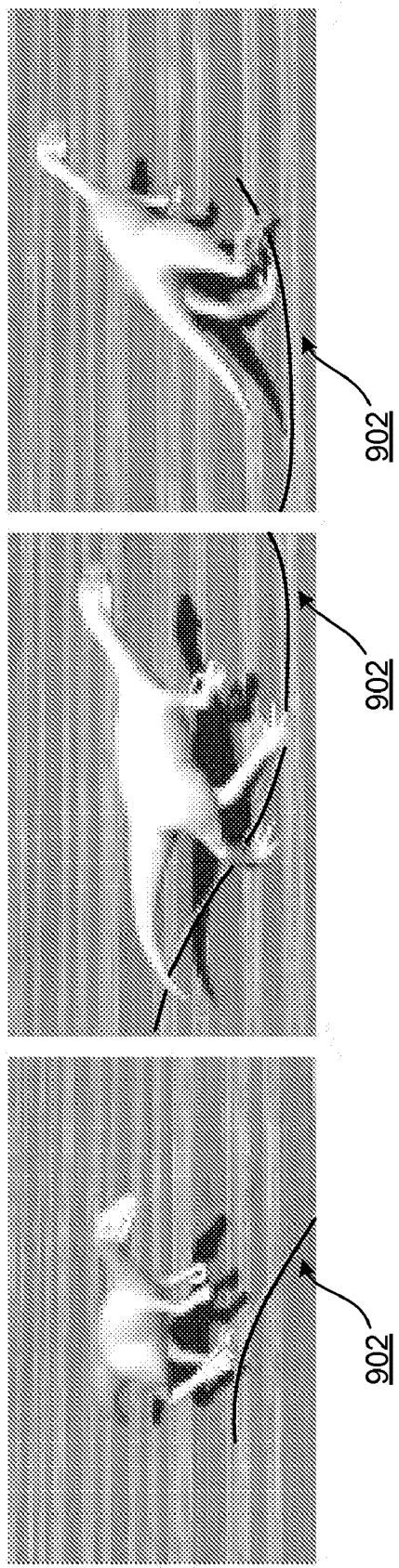
FIG. 9 is a diagram of results of an exemplary method path editing.

During path editing, the user sketches a curve on the ground as a new motion path. Then, the exemplary method 700 or the exemplary animated mesh editor 104 automatically adapts the original mesh sequence to follow the new path. FIG. 9 shows the path of a planar and linear walking sequence (i.e., the top row of frames in FIG. 8) that has been adapted to a user-sketched curve 902 in FIG. 9.

To estimate the motion path of the original mesh sequence, an exemplary method first projects the centroids of the meshes in the original sequence onto the ground, and then fits a B-spline curve through these projected points. The path editing method builds correspondence between the original path $p_{orig}(s)$ and the new one $p_{new}(t)$ using arc length. In one implementation, there is a default local coordinate frame at any point on the path. It is defined by the tangent, normal and binormal, at that point. Suppose $p_{orig}(sk)$ is the point for frame k on the original path, and it corresponds to $p_{new}(tk)$ on the new path. The method uses the rigid body transform between the two local frames at these two points to transform the mesh at frame k in the original sequence so that the transformed mesh has a position and orientation consistent with the new path.

There is one additional issue with footprints. Since a footprint may last a few frames, each of which may have different transforms, the same footprint in the original sequence may be transformed to multiple different locations. In one implementation, the exemplary path method simply averages these multiple locations and sets the result as the corresponding footprint for the edited sequence. To make the transformed meshes consistent with the new footprints, an exemplary system applies the exemplary spacetime techniques described above with respect to the animated mesh editor 104 to these transformed meshes while considering the new footprints as handle constraints.

Figure 10:
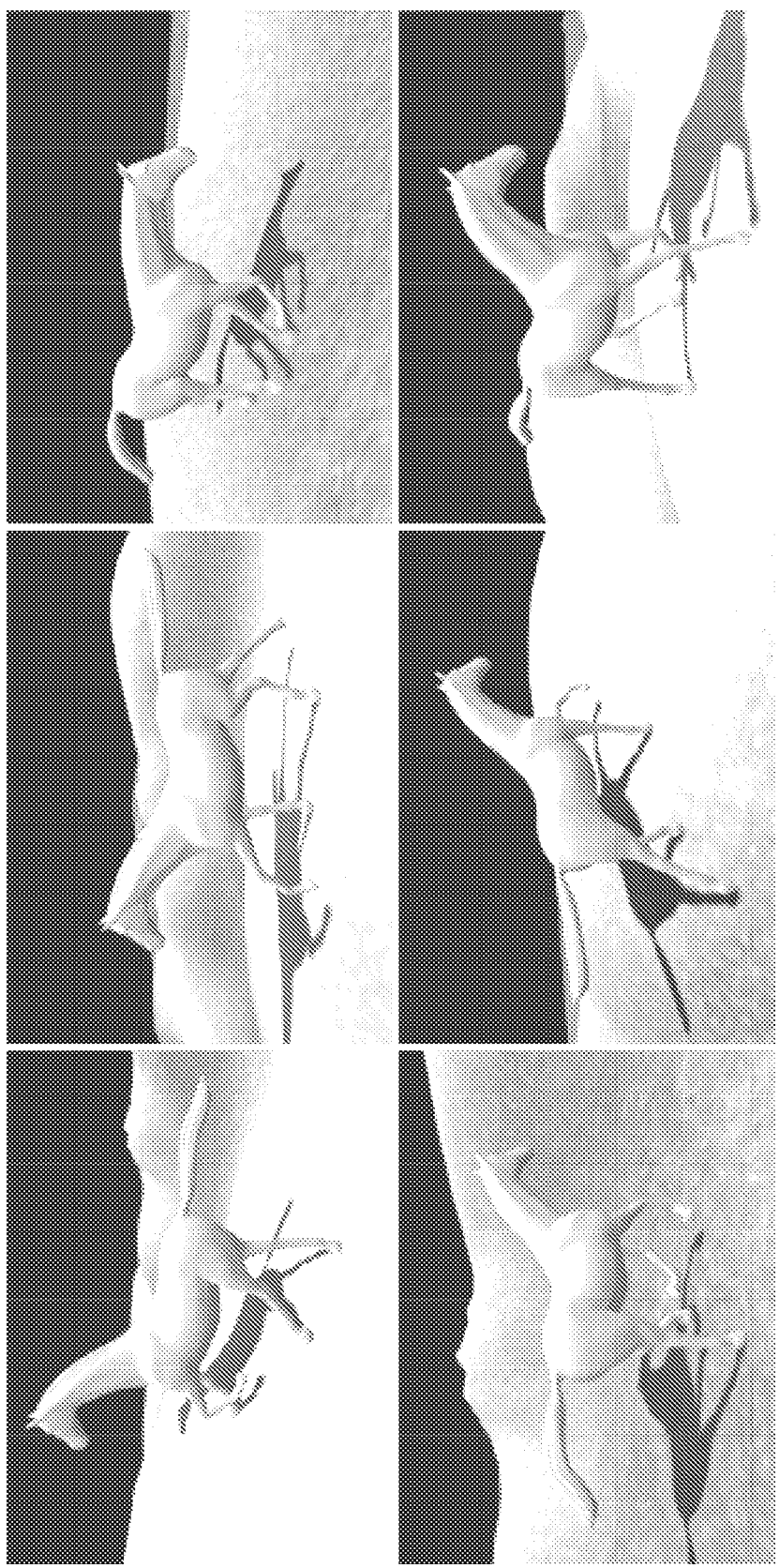
FIG. 10 is a diagram of results of an exemplary method of combined footprint editing, path editing, and keyframe editing.

FIG. 10 shows a more complex example where a straight run, in which the original deforming mesh sequence moves along a straight line on a planar surface, is adapted to a curved path on an uneven terrain. During the editing depicted in FIG. 10, the user has adjusted the pose of the horse's head to make the animation look more natural. In fact, in FIG. 10 a straight run is first adapted to a curved path on an uneven terrain—the user first makes the horse move along a curve using path editing. Then, the user adapts the sequence onto the terrain using footprint editing.

Handle-based Deformation Mixing Method

Deformation transfer has been used for making a static mesh follow the deformation sequence of a second mesh. Conventional deformation transfer algorithms require a complete or nearly complete correspondence between triangles on the two meshes. An exemplary deformation mixing method, on the other hand, starts with two deforming meshes and generates a new third sequence that mixes the large-scale deformations of the first mesh sequence with the small-scale deformations of the second mesh sequence. The exemplary deformation mixing method uses the motion trajectories of a sparse set of handles on the first mesh to define the large-scale deformations of the new mesh sequence, and forces the corresponding handles on the second mesh to follow these trajectories in the new mesh sequence. A user only has to define the correspondence between handles on the two starting meshes.

Each handle on the two starting meshes generates a motion trajectory within its own respective mesh sequence. Since there may be global differences between two corresponding trajectories, directly forcing the second handle to follow the trajectory of the first one may produce noticeable inconsistencies between the transferred handle trajectory and the rest of the deformation on the second mesh. Therefore, the exemplary method first aligns the two corresponding trajectories using a global transformation, including scaling, translation, and rotation, between them. After that, the exemplary method sets the transformed handle positions and rotations from the first trajectory as constraints for the corresponding handle on the second mesh. The method repeatedly sets up such constraints on the second mesh for all the handles defined on the first mesh, and then applies the spacetime solving techniques (e.g., as executed by the animated mesh editor 104) to deform each frame of the second sequence.

Figure 11:
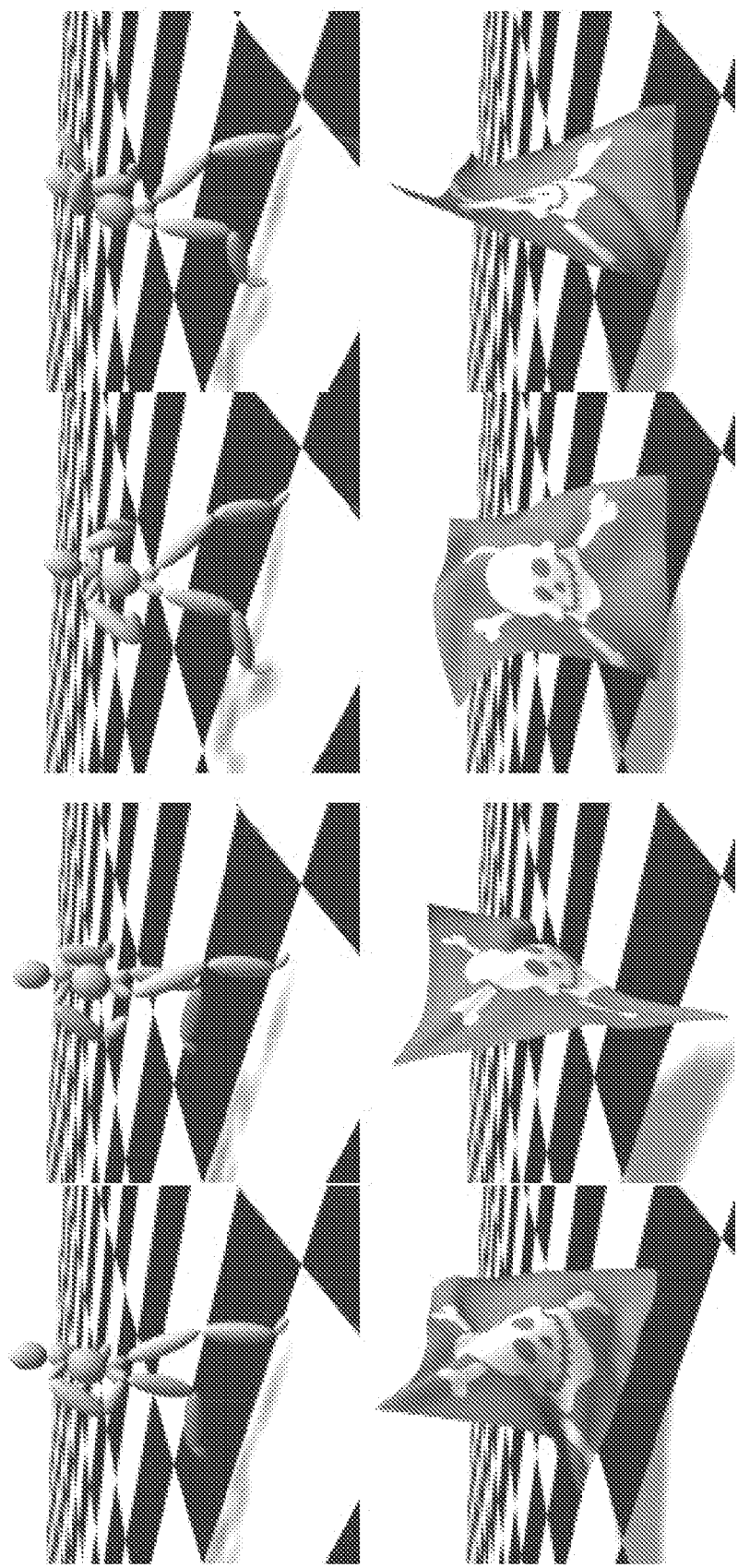
FIG. 11 is a diagram of results of an exemplary method of handle-based deformation editing.

FIG. 11 shows exemplary deformation mixing results. The method mixes human motion, such as running and boxing, with a second figure in a second sequence, e.g., a cloth animation (in this case, a flag blowing in the wind). The moving wrinkles of the flag are well preserved using the exemplary method. The top row of FIG. 11 shows example MoCAP data for running. The bottom row shows the motions of the running sequence of the top row, mixed with the flag animation. The wrinkles on the cloth are originally generated using cloth simulation. The user defines corresponding handles between the human model and the cloth. For instance, handles on the arms of the human model can correspond to the upper corners of the cloth while handles on the feet of the human model correspond to lower corners of the cloth.

Mesh Deformation Filtering Method

Once multiple handles have been defined on a mesh sequence, the trajectory of the center of each handle becomes a temporal signal. Instead of transferring the signals to a second mesh in a one-to-one manner as in the previous section, an exemplary mesh deformation filtering method can apply signal processing techniques to produce filtered versions of the trajectories, and then use these filtered trajectories as constraints on the handles to deform the original mesh sequence. In a deforming mesh sequence, the mesh surface itself has characteristic small-scale details in addition to frame-to-frame deformations. The exemplary deformation filtering method alters the latter but preserves the details. Performing filtering at the level of handles allows the exemplary method to achieve this goal, while on the contrary, directly filtering the trajectory of each vertex would destroy such details.

In one implementation, the exemplary mesh deformation filtering method further allows the user to create a hierarchy among the handles. The root of the hierarchy is typically the centroid of the entire mesh. The centroids of the meshes at all frames define the trajectory of the root. All of the user-defined handles are children of the root. The user can optionally set one handle as a child of another handle. There is a local coordinate frame at each node of the hierarchy. The trajectory of each handle is transformed to the local coordinate frame at its parent. All these relative trajectories, as well as the global trajectory at the root, are subject to filtering. However, detected footprints may be exempted from filtering to avoid footskating. The filtered relative trajectories are transformed back to the world coordinate system before being used as constraints in the exemplary spacetime solving techniques, e.g., as implemented in the animated mesh editor 104.

One cartoon animation filter is interesting in that it can produce exaggerated cartoon style motion (Wang, J., Drucker, S., Agrawala, M., and Cohen, M., "The cartoon animation filter," *ACM Transactions on Graphics*, 2006, 25, 3, 1169-1173, which is incorporated by reference herein.) The filter is actually a signal enhancement filter defined as in Equation (7):

$$X^*(t) = X(t) - X(t) \otimes LOG, \quad (7)$$

where LOG is the Laplacian of the Gaussian, $X^*(t)$ is the original signal, and $X^*(t)$ is the filtered signal. One implementation of the exemplary mesh deformation filtering method utilizes this filter successfully.

Figure 12:
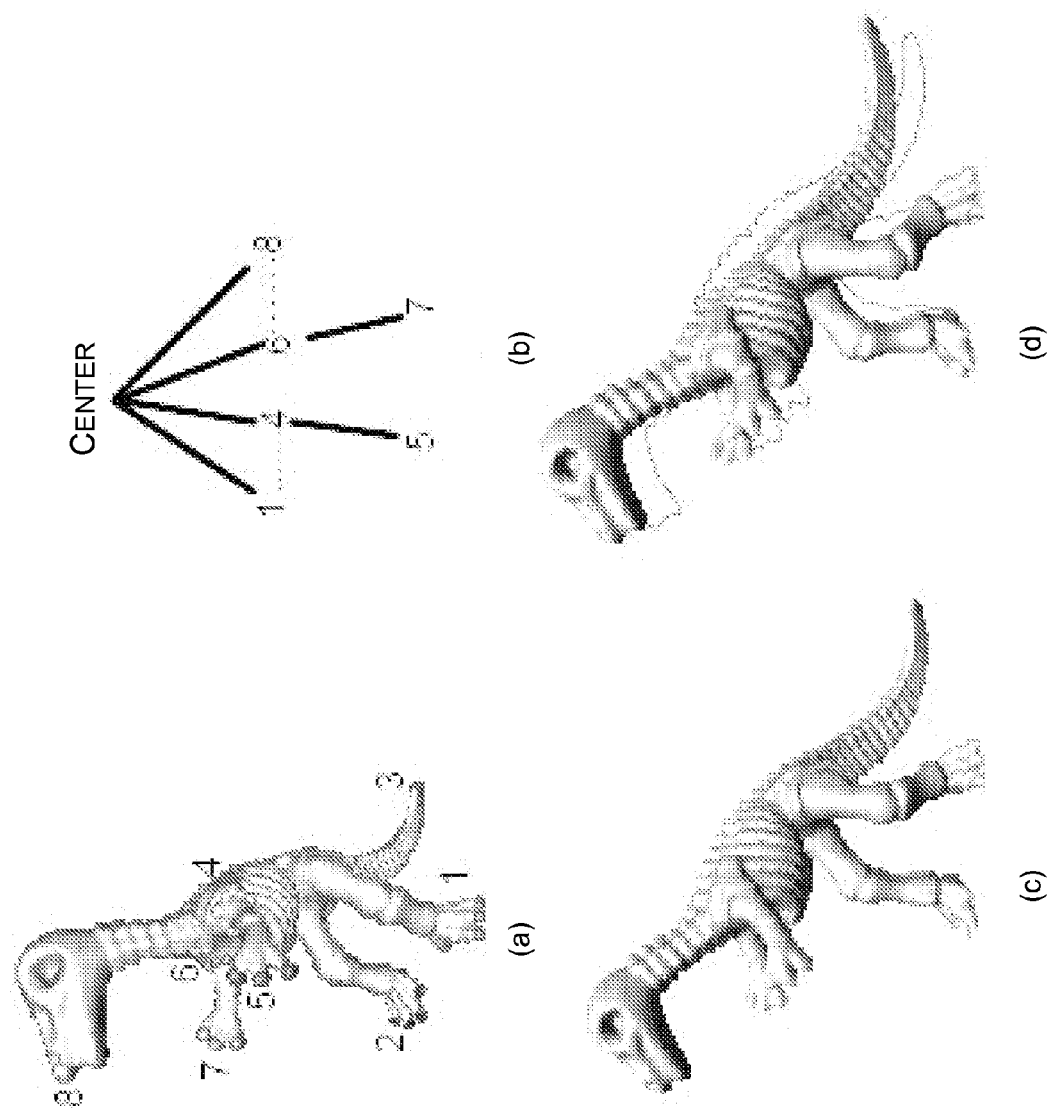
FIG. 12 is a diagram of results of an exemplary method of mesh deformation filtering.

FIG. 12 shows an exemplary filtering example. FIG. 12(*a*) shows the user-specified handles. FIG. 12(*b*) shows the initial hierarchy among the user-specified handles defined for the illustrated dinosaur. The trajectory of each handle is filtered to create cartoon style motion. To maintain existing contact constraints, the foot trajectories are not filtered. FIG. 12(*c*) shows one frame in the original deforming mesh sequence. FIG. 12(*d*) shows a filtered result (i.e., exaggerated, cartoon-like caricature of motion) for the frame, with the silhouette of the original shape in the background.

Spacetime Morphing Method

Spacetime morphing is introduced herein as a new application based on the above-described animated mesh editing methods. The exemplary spacetime morphing method morphs a source deforming mesh $A^s$ to a target deforming mesh $A^t$ in terms of both shape and deformation. For example, given a walking dinosaur as the source mesh and a walking lion as the target mesh, the exemplary spacetime morphing method generates a new sequence, in which the shape of the dinosaur is morphed into the shape of the lion while the dinosaur's walking transitions into the lion's walking.

In one implementation, in a preprocessing step, both initial deforming sequences are remeshed so that every pair of corresponding frames has the same topology. To achieve this, in one implementation, the exemplary method first performs cross-parameterization between the first pair of corresponding frames as in Kraevoy, V., and Sheffer, A., "Cross-parameterization and compatible remeshing of 3-d models," *ACM Transactions on Graphics*, 2004, 23, 3, 861-869, which is incorporated herein by reference. The exemplary method then binds the resulting meshes to their respective control meshes by computing mean value coordinates for their vertices: $\tilde{V}^{f,0} = W^0 V^{c,0}$, where $\tilde{V}^{f,0}$ represents the set of vertices from a resulting mesh, $W^0$ is the matrix of mean value coordinates, and $V^{c,0}$ is the set of vertices from its control mesh. Then each subsequent frame is generated as follows. The exemplary method maintains the same topology as the cross-parameterized mesh at the first frame and computes the new vertex positions using the formula $\tilde{V}^{f,k} = W^0 V^{c,k}$, where $\tilde{V}^{f,k}$ represents the new vertex positions at the k-th frame, and $\tilde{V}^{c,k}$ represents the vertices of the control mesh at the k-th frame. In one exemplary implementation, $\tilde{V}^{c,k}$ may be computed as described above with respect to the control mesh transfer engine 204—using the original mesh topology.

Before the start of morphing, the exemplary method designates a temporal morph interval for $A^s$ and $A^t$ respectively. Assuming the interval is $(f_1^s, f_2^s)$ for the source and $(f_1^t, f_2^t)$ for the target (the number of frames in the two intervals can be different), the method aligns the two mesh sequences in the world coordinate system. This may be achieved by computing an optimal rigid transformation to make the mesh at $f_1^t$ align with the mesh at $f_1^s$, or alignment can be specified by user input. The computed transformation is then applied to every frame in $A^t$ to align the two sequences. Finally, the exemplary method blends the portion of the two sequences inside the morph intervals. For each blended frame, the method calculates a parameter t ($\in [0,1]$) to sample a source and target mesh from $(f_1^s, f_2^s)$ and $(f_1^t, f_2^t)$ respectively. The local frames and Laplacian differential coordinates of the sampled meshes are interpolated using a method similar to the one presented in Lipman, Y., Sorkine, O., Levin, D., and Cohen-Or, D., "Linear rotation-invariant coordinates for meshes," *ACM Transactions on Graphics*, 2005, 24, 3, which is incorporated herein by reference. Then the exemplary method reconstructs a mesh for the blended frame from the interpolated Laplacian coordinates.

The exemplary method carefully tracks constraints, such as footprints in walking motion, in the spacetime morphing. In the morph interval, the exemplary method marks the frames where a constraint should be satisfied and maintains that constraint when the method solves the meshes for the blended frames.

Figure 13:
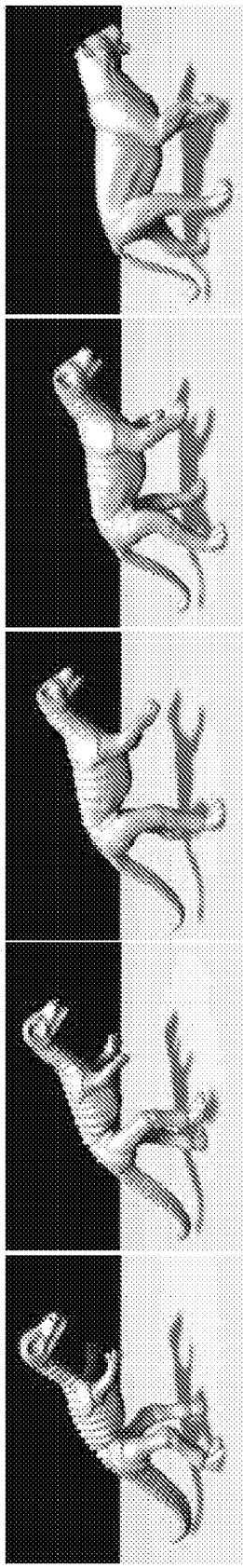
FIG. 13 is a diagram of results of an exemplary method of spacetime morphing.

FIG. 13 demonstrates the above-described exemplary spacetime morphing method. In the illustrated example, the exemplary method concatenates dinosaur walking with lion walking by morphing the dinosaur into the lion in one-and-a-half walking cycles (starting out with the right foot of the dinosaur). The middle three images in FIG. 13 show how the shape and motion of the two original sequences are blended to generate the final results.

CONCLUSION

This disclosure described a variety of deforming mesh sequence editing systems, methods, and results. An exemplary system, prior to interactively editing a deforming mesh sequence, transfers the control mesh at the first frame of the received mesh sequence to all frames, and computes the mean-value matrix from this control mesh to the fine mesh of each frame. Laplacian matrices used for minimizing Equation (4), above, can be pre-computed. Once the user has specified handles, the exemplary system obtains sparse coefficient matrices, and pre-computes the factorization of such sparse matrices for each frame.

An editing session may have both online and offline stages. During online keyframe editing, the exemplary system can provide interactive frame rates. This is achieved by using the subspace solver 216 to show approximate initial solutions quickly. The alternating least-squares engine 222 may be activated by the user only when the subspace solver 216 cannot produce satisfactory results. After keyframe editing, the exemplary system may perform offline computation to obtain the entire edited sequence, for example, to solve for each frame when there are more than 100 frames in the sequence.

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer implemented method operable on a processor, the method comprising:
receiving an animated mesh;
editing, by the processor, the animated mesh by applying Laplacian mesh editing techniques in a spacetime domain,
wherein editing the animated mesh includes:
rotating a selected subset of neighboring vertices within a frame of the animated mesh together about an axis when one vertex of the subset of neighboring vertices is rotated about the axis;
adjusting a deformation of the animated mesh at the frame to satisfy a constraint introduced by the editing, the adjusting including applying a geometric subspace deformation to deduce rotations from the constraint via a nonlinear optimization; and
propagating the constraint and the deformation to remaining frames of the animated mesh sequence to create a new animated mesh sequence; and
outputting the new animated mesh sequence.

2. The method as recited in claim 1, wherein adjusting the deformation of the mesh includes satisfying an environmental constraint induced by an environment of the animated mesh sequence.

3. The method as recited in claim 1, wherein adjusting the deformation of the mesh at the frame includes transferring a control mesh across frames in the animated mesh sequence to provide a deformation subspace for each frame.

4. The method as recited in claim 1, wherein adjusting the deformation of the mesh at the frame includes applying an alternating least-squares process, wherein the alternating least-squares process uses initial input from the geometric subspace deformation.

5. The method as recited in claim 4, wherein the alternating least-squares process includes iterating between local rotation solving and vertex position solving.

6. The method as recited in claim 1, wherein the propagated deformations are used for computing target differential coordinates for the frames, the deformations being defined as local transforms of the differential coordinates between a pair of original and deformed frames.

7. The method as recited in claim 1, wherein propagating the constraint and the deformation to the remaining frames of the animated mesh sequence includes:
editing handle trajectories via a least-squares technique to propagate the constraints as boundary conditions; and
reconstructing the mesh of a remaining frame from the target differential coordinates and the boundary conditions.

8. The method as recited in claim 7, wherein reconstructing the mesh includes interpolating a rotation at each vertex for each intermediate frame between two keyframes.

9. The method as recited in claim 1, wherein editing a frame includes one of: selecting a frame to edit or selecting a handle to edit.

10. The method as recited in claim 1, further comprising editing footprints in the animated mesh, including:
receiving input from a user to reposition original footprints in the animated mesh to revised footprint locations; and
using the revised footprint locations as constraints on the handles during the editing.

11. The method as recited in claim 1, further comprising editing a path in the animated mesh, including:
receiving input from a user to designate a curve as a revised motion path; and using the revised motion path as constraints on the handles during the editing.

12. The method as recited in claim 1, further comprising applying handle-based deformation mixing, including:
receiving input from a user to designate handles on a first animated mesh, wherein the handles define large-scale deformations of the first mesh;
associating the handles on the first animated mesh with corresponding handles on a second animated mesh;
generating a third animated mesh that mixes the large-scale deformations of the first mesh with small-scale deformations of the second mesh.

13. The method as recited in claim 1, further comprising applying mesh deformation filtering, including:
arranging at least some of the handles of the animated mesh into a hierarchy; determining a trajectory signal associated with the center of each handle;
applying one or more signal processing techniques to at least some of the trajectory signals to produce filtered trajectory signals; and
using the filtered trajectory signals as constraints on the handles during the editing.

14. The method as recited in claim 1, further comprising applying morphing in the spacetime domain to the animated mesh, including:
cross-parameterizing a first animated mesh possessing a first shape and a first motion with a second animated mesh possessing a second shape and a second motion;
generating a third animated mesh to morph the first shape and the first motion into the second shape and the second motion over a time interval.

15. A system, comprising:
a processor,
memory coupled to the processor;
an editor operative on the processor, configured to modify a first animated mesh sequence into a second animated mesh sequence in a spacetime domain;
an engine in the editor configured to apply alternating least-squares to a Laplacian mesh editing technique; and
a propagator configured to transfer constraint and deformation information from edited keyframes of the first animated mesh sequence as boundary conditions to remaining frames of the first animated mesh sequence via a least-squares technique, the propagator configured to rotate a selected subset of neighboring vertices within a frame of the first animated mesh sequence together about an axis when one vertex of the subset of neighboring vertices is rotated about the axis.

16. The system as recited in claim 15, wherein the engine applies the alternating least-squares to iteratively solving vertex positions of the animated mesh and local rotations of each vertex.

17. A system, comprising:
a processor,
memory communicatively coupled to processor, the memory having stored instructions that, when executed at the system, configure the system to implement:
means for receiving an animated mesh;

means for editing the animated mesh, by the processor, by applying Laplacian mesh editing;
means for selection of an arbitrary subset of neighboring vertices within a frame of the mesh;
means for dragging one vertex in the subset of neighboring vertices to rotate the remaining vertices in the subset about an axis, the remaining vertices rotating together;

means for applying a geometric subspace deformation to deduce rotations from a constraint via a nonlinear optimization; and
means for outputting an edited animated mesh.

* * * * *